(12) United States Patent
Akiyama et al.

(10) Patent No.: US 7,310,454 B2
(45) Date of Patent: Dec. 18, 2007

(54) PHOTONIC BANDGAP MODULATOR, AMPLIFIER, DEMUX, AND TDM DEVICES

(75) Inventors: Shoji Akiyama, Brighton, MA (US); Lionel C. Kimerling, Concord, MA (US); Kazumi Wada, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/852,386

(22) Filed: May 24, 2004

(65) Prior Publication Data

US 2005/0259922 A1   Nov. 24, 2005

(51) Int. Cl.
*G02F 1/295* (2006.01)
*G02B 6/26* (2006.01)
*G02B 6/42* (2006.01)

(52) U.S. Cl. .................. 385/9; 385/4; 385/5; 385/8; 385/39; 385/50; 385/122

(58) Field of Classification Search .................. 385/2, 385/8–10, 15–24, 31, 40, 49–50; 250/227.12–227.17; 359/237, 245–248, 250, 259–260, 263–264
See application file for complete search history.

(56) References Cited

U.S. PATENT DOCUMENTS

| | | | | |
|---|---|---|---|---|
| 5,023,944 A | * | 6/1991 | Bradley | 359/107 |
| 5,212,584 A | * | 5/1993 | Chung | 359/260 |
| 5,425,115 A | * | 6/1995 | Wagner | 385/16 |
| 5,452,127 A | * | 9/1995 | Wagner | 359/486 |
| 5,457,570 A | * | 10/1995 | Lu et al. | 359/361 |
| 5,583,683 A | * | 12/1996 | Scobey | 398/79 |
| 5,719,989 A | * | 2/1998 | Cushing | 359/589 |
| 5,907,427 A | * | 5/1999 | Scalora et al. | 359/248 |
| 6,028,693 A | * | 2/2000 | Fork et al. | 359/248 |
| 6,115,401 A | * | 9/2000 | Scobey et al. | 372/100 |
| 6,215,592 B1 | * | 4/2001 | Pelekhaty | 359/618 |
| 6,262,830 B1 | * | 7/2001 | Scalora | 359/248 |
| 6,304,366 B1 | * | 10/2001 | Scalora et al. | 359/328 |
| 6,343,167 B1 | * | 1/2002 | Scalora et al. | 385/37 |
| 6,396,617 B1 | * | 5/2002 | Scalora | 359/248 |
| 6,473,541 B1 | * | 10/2002 | Ho | 385/15 |
| 6,490,381 B1 | * | 12/2002 | Adair et al. | 385/16 |

(Continued)

FOREIGN PATENT DOCUMENTS

EP   0012439 A1   6/1980

(Continued)

OTHER PUBLICATIONS

"Theory, Experimental Realization, and Properties of Miniature BRAGG Fibers," Fleming et al. *MEMS and Novel Silicon Technologies*, Sandia National Laboratories. Albuquerque, NM, no date.

*Primary Examiner*—Frank G. Font
*Assistant Examiner*—Ryan Lepisto
(74) *Attorney, Agent, or Firm*—Gauthier & Connors LLP

(57) ABSTRACT

An optical device includes at least two photonic bandgap crystal (PBG) stacks that are each comprised of alternating layers of high and low index materials. A defect region is formed in a cavity region between the at least two photonic bandgap crystal stacks so as to provide the properties needed to reflect light received by the optical device.

16 Claims, 7 Drawing Sheets

U.S. PATENT DOCUMENTS

| | | | |
|---|---|---|---|
| 6,593,212 B1* | 7/2003 | Kub et al. | 438/458 |
| 6,624,945 B2* | 9/2003 | Fan et al. | 359/584 |
| 6,643,054 B1* | 11/2003 | Weidlich | 359/298 |
| 6,678,093 B1* | 1/2004 | Scobey et al. | 359/578 |
| 6,684,003 B2* | 1/2004 | Lipson et al. | 385/23 |
| 6,710,912 B1* | 3/2004 | Filkins et al. | 359/326 |
| 6,744,552 B2* | 6/2004 | Scalora et al. | 359/326 |
| 6,788,838 B2* | 9/2004 | Ho | 385/15 |
| 6,813,076 B2* | 11/2004 | Okubo et al. | 359/484 |
| 6,826,342 B1* | 11/2004 | Bise et al. | 385/125 |
| 6,859,321 B2* | 2/2005 | Kimerling et al. | 359/578 |
| 2001/0028029 A1* | 10/2001 | Scalora et al. | 250/216 |
| 2001/0032977 A1* | 10/2001 | Abe et al. | 257/15 |
| 2002/0054424 A1* | 5/2002 | Miles | 359/291 |
| 2002/0094153 A1* | 7/2002 | Lipson et al. | 385/23 |
| 2002/0135853 A1* | 9/2002 | Scalora | 359/248 |
| 2003/0029496 A1* | 2/2003 | Wada et al. | 136/256 |
| 2003/0053785 A1* | 3/2003 | Ho | 385/129 |
| 2003/0087121 A1* | 5/2003 | Domash et al. | 428/641 |
| 2003/0228091 A1* | 12/2003 | Lee et al. | 385/18 |
| 2004/0136076 A1* | 7/2004 | Tayebati | 359/578 |

FOREIGN PATENT DOCUMENTS

| | | |
|---|---|---|
| EP | 0646999 A1 | 4/1995 |
| WO | WO/03/102633 A2 | 12/2003 |
| WO | WO03/102633 A3 | 12/2003 |

* cited by examiner

PHOTONIC BANDGAP MODULATOR, AMPLIFIER, DEMUX, AND TDM DEVICES

BACKGROUND OF THE INVENTION

The invention relates to the field of photonic bandgap crystals, and in particular to forming compact and simple devices using photonic bandgap crystals.

A photonic bandgap crystal (PBG) has been widely investigated recently due to its unique property. It is well known that by employing a PBG structure, high reflection is easily achieved by sandwiching a defect layer between two PBG stack layers. It is possible to form a cavity mode with a high Q (quality factor) using a PBG structure, where a specific wavelength can be transmitted and other wavelengths are reflected. There have been various optical devices formed using PBG structures in integrated optics, but most of these devices are limited to two-dimensional optical waveguide structures by which light can be guided along a waveguide or optical fiber.

SUMMARY OF THE INVENTION

According to one aspect of the invention, there is provided an optical device. The optical device includes at least two photonic bandgap crystal (PBG) stacks that are each comprised of alternating layers of high and low index materials. A defect region is formed in a cavity region between the at least two photonic bandgap crystal stacks so as to provide the properties needed to reflect light received by the optical device.

According to another aspect of the invention, there is provided a method of forming an optical device. The method includes forming at least two photonic bandgap crystal (PBG) stacks that are each comprised of alternating layers of high and low index materials. A defect region is formed in a cavity region between the at least two photonic bandgap crystal stacks so as to provide the properties needed to reflect light received by the optical device.

DETAILED DESCRIPTION OF THE INVENTION

The invention utilizes PBG structures to form three dimensional device structures, such as modulators, amplifiers, and multiplexers. Given the apparent limitations of the present state of the technology, forming three dimensional PBG structures greatly enhances the ability to use optical technology. Moreover, the size of a standard PBG structure will allow one to incorporate this technology in integrated systems without hindering the performance of such systems.

Figure 1A:
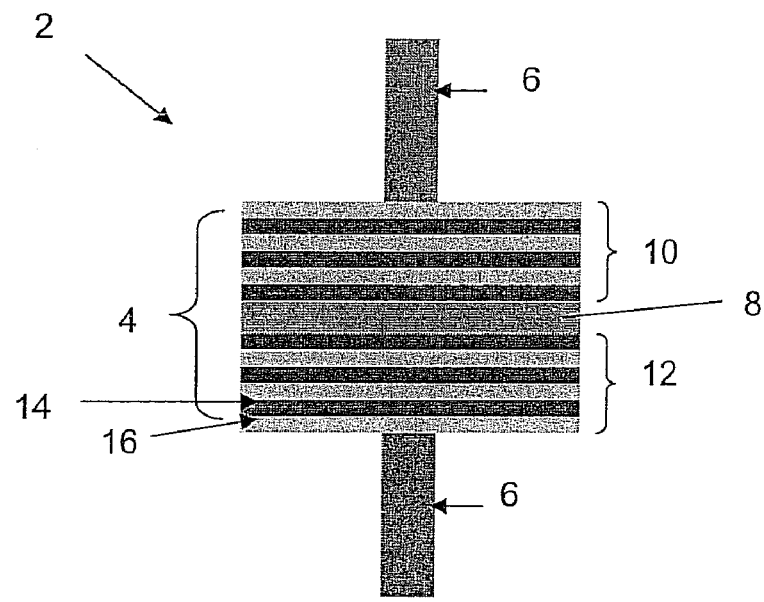
FIG. 1A is a schematic diagram of a modulator in accordance with the invention.

FIG. 1A shows a modulator 2 that includes a PBG structure 4 that is integrated into an optical waveguide 6 by placing the PBG structure 4 perpendicular to the optical waveguide 6. A defect layer 8 is sandwiched-between two PBG stacks 10, 12 on both sides. Moreover, the defect layer 8 having a $\lambda/2n$ thickness and made from electro-optic materials or non-linear optical materials, where n is refractive index of the materials. Note that the PBG stacks 10, 12 are comprised of alternating layers of high 14 and low 16 index materials. The high 14 and low 16 index layers each have a thickness of $\lambda/4n$. In addition, the high 14 and low 16 index materials can be comprised of materials, such as Si and SiO2, respectively, or Si and SiN. In this embodiment, each PBG stack 10, 12 have three sets of alternating high and low index layers, however, in other embodiments that number can vary.

Figure 1B:
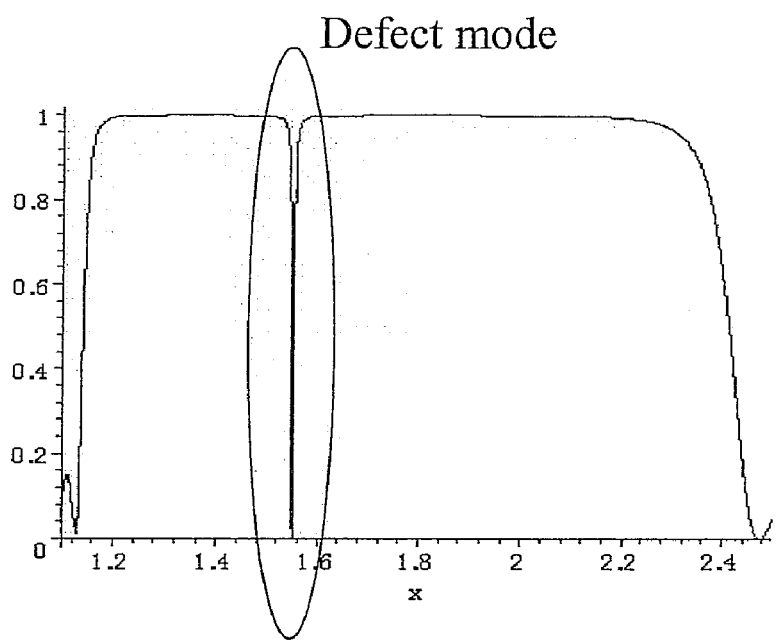
FIG. 1B is a graph demonstrating the properties of the inventive modulator.
Figure 1C:
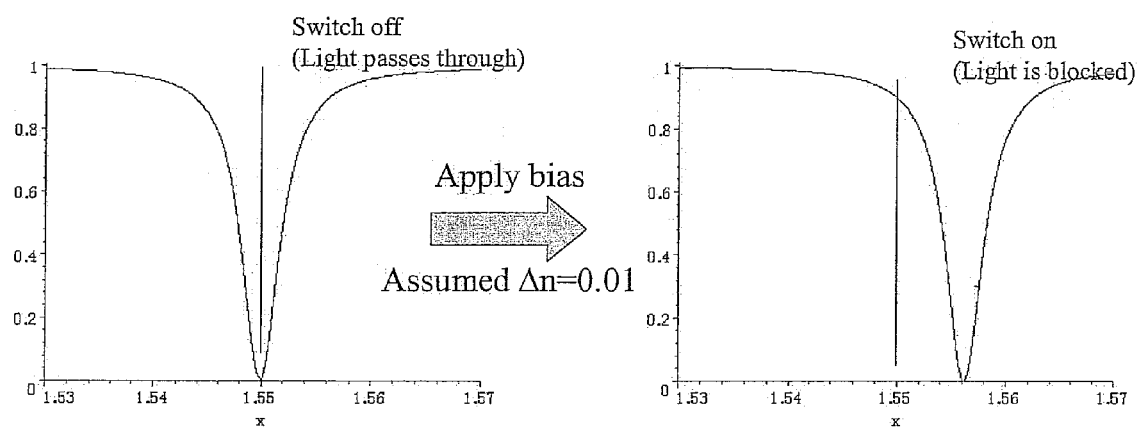
FIG. 1C is a graph demonstrating the properties of the inventive modulator when the wavelength matches the defect mode.

By changing the refractive index of the defect layer by applying bias or the like, this device works as a modulator or a switch having a defect mode, as is shown in FIG. 1B. If the wavelength matches the defect mode as shown in FIG. 1C, the light can go through the PBG structures without significant loss. By changing the refractive index of the defect layer slightly by applying a bias, the defect mode shifts, and the light is blocked by a PBG stop band.

Figure 2:
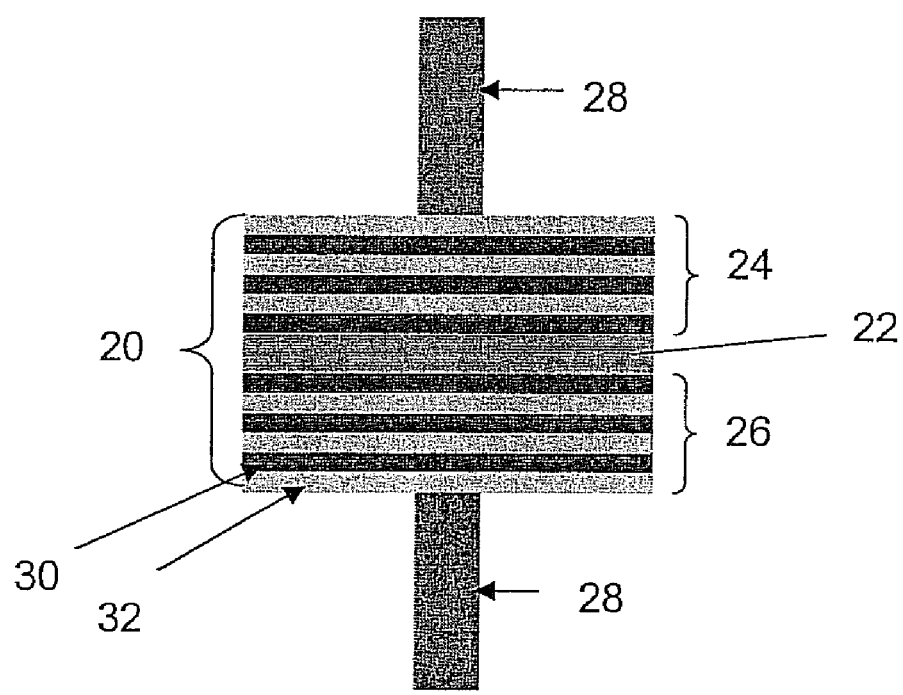
FIG. 2 is a schematic diagram of an optical amplifier in accordance with the invention.

An optical amplifier can be formed using a PBG structure 20 that is perpendicular to an optical waveguide 28, as shown in FIG. 2. A defect layer 22 is sandwiched between two PBG stacks 24, 26 on both of its sides. Also, the defect layer 22 has a thickness of $\lambda/2n$ and doped with amplifying material, such as Erbium or the like. The PBG stacks 24, 26 comprise alternating layers of high 30 and low 32 index materials. The high 30 and low 32 index layers have a thickness of $\lambda/4n$, and can be comprised of Si and SiO2, respectively, or Si and SiN.

A PBG structure usually has a high quality factor (Q). The high amplifying effect is achieved since the path length of the light can be expressed by the "quality factor* $\lambda/2$". If it is assumed that the layers of the PBG structures used in this embodiment have a thickness of 0.5 mm and Q is 1,000, then the actual path length will be 0.5 µm*1,000=500 µm. Therefore, a long amplifying path length using a compact device can be achieved.

Figure 3:
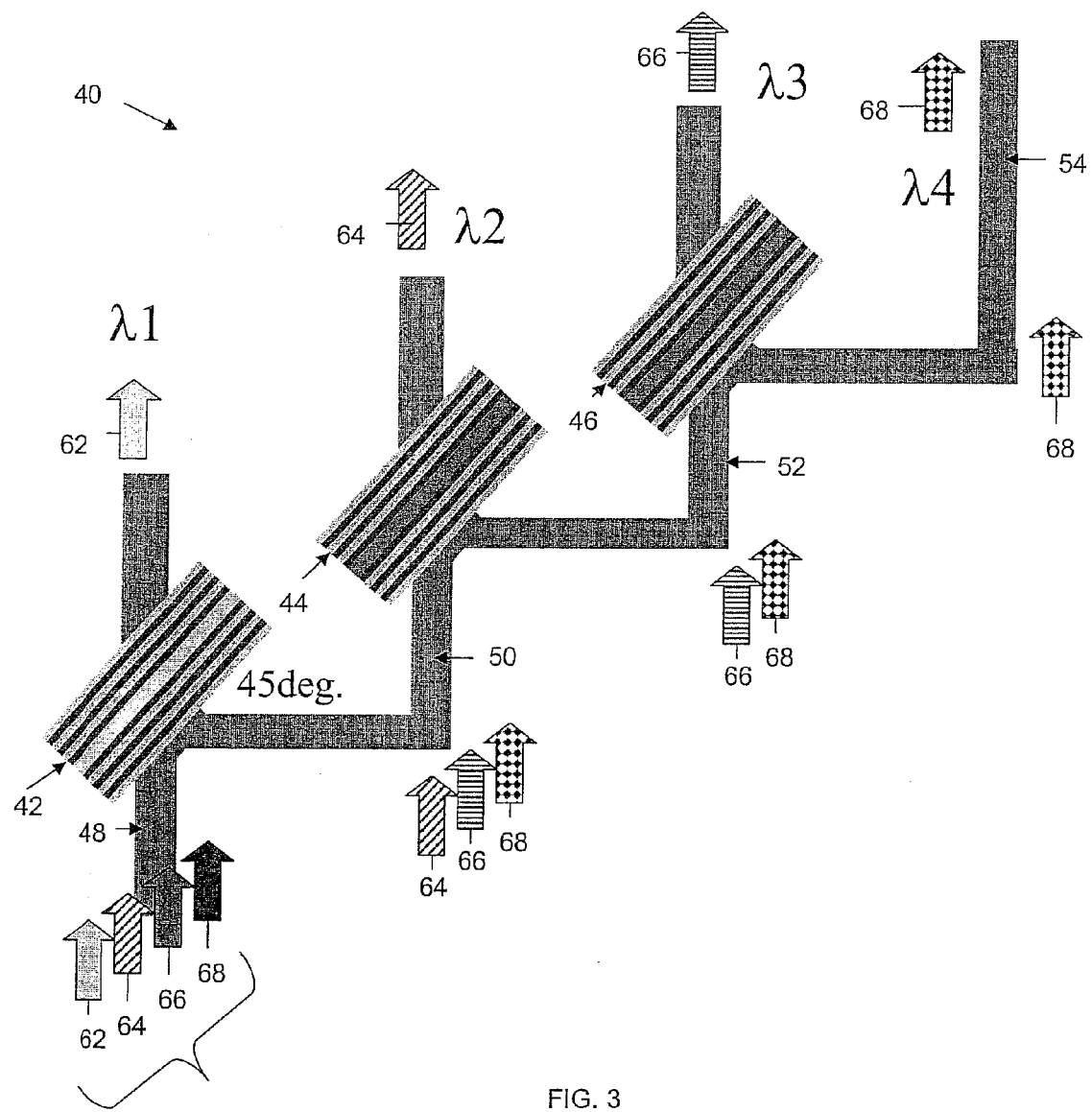
FIG. 3 is a schematic diagram of a de-multiplexer in accordance with the invention.

In forming a de-multiplexer (demux) device 40, a selective number of PBG structures 42, 44, and 46 are placed at an angle to their respective input 48, 50, and 52 and output waveguides 70, 72, 74, and 54, as shown in FIG. 3. Note that input signal 59 is comprised of wavelengths 62, 64, 66, and 68. Each PBG structure has a defect layer whose thickness is $\lambda_s/2n$, where $\lambda_s$ varies depending on its target wavelength and n is the index of the materials used in the defect layers. Moreover, each PBG structure 42, 44, and 46 has a different thickness to pick up different specific wavelengths 62, 64, 66, and 68. Therefore, a wavelength 62, 64, 66, or 68 which matches the defect mode of the PBG structure 62, 64, 66, or 68 can pass through and be outputted to an output waveguide 70, 72, 74, or 54. The other wavelengths are reflected and guided into an input waveguide 50 or 52, thus allowing light with various wavelengths to be de-multiplexed.

Figure 4:
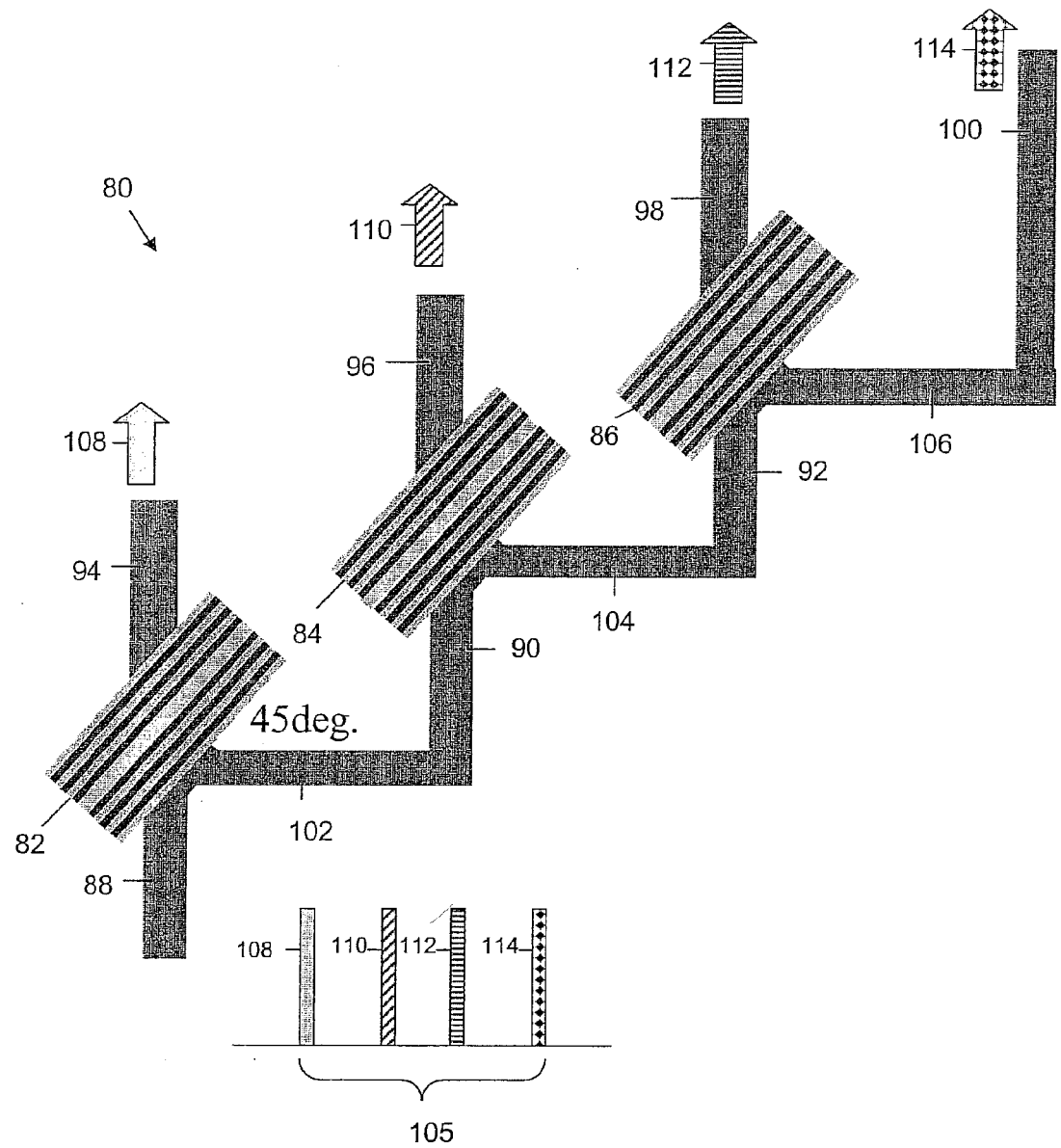
FIG. 4 is a schematic diagram of a time domain multiplexer in accordance with the invention.

In forming a time division multiplexer (TDM) device 80, several PBG structures 82, 84, and 86 are placed at a tilted angle, in this case 45 degrees, between their respective input 88, 90, and 92 and output 94, 96, 98, and 100 optical waveguides, as shown in FIG. 4. Note that the input signal 105 is comprised of wavelengths 108, 110, 112, and 114. Each PBG structure 82, 84, and 86 includes a reflected waveguide 102, 104, and 106 that guides light that has been reflected from the PBG structure. The reflected waveguides 102, 104, and 106 act as an input waveguide to a successive PBG structure by providing the reflected light as input.

Moreover, each PBG structure 82, 84, and 86 has a defect layer 116, 118, and 120 whose thickness is $\lambda/2n$, where n is the index of the materials used in the defect layers 116, 118, and 120, respectively. The difference between the PBG structures 42, 44, and 46 described in the demux device and that used in the TDM device is that all the PBG structures 82, 84, and 86 have defect layers that are similarly sized. In this embodiment, each defect layer 116, 118, and 120 is made either from electro-optic material or non-linear optical material. When the switch is on or bias is applied to the defect layer, the light that is reflected goes to the next PBG structure by way of its reflected waveguide 102, 104, and 106. By applying electric bias to each PBG structure 102, 104, and 106, a light signal is distributed.

Figure 5A:
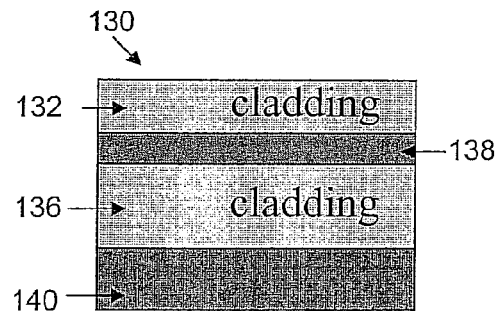
FIGS. 5A-5F is a schematic diagram illustrating the steps associated with forming a PBG structure.
Figure 5B:
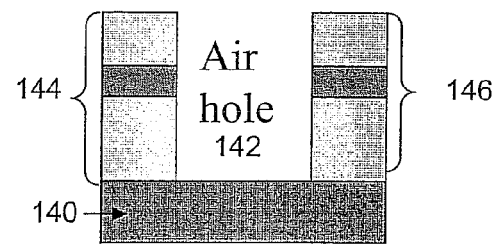

FIG. 5A-5H shows the steps taken to form the PBG structures described herein. FIG. 5A shows the initial construction of the waveguide structure 130 that is to be coupled to a PBG structure. The waveguide structure 130 includes two cladding regions 132, 136 and a core 138, and is formed on a substrate 140, such as Si or the like. Moreover, the core 138 can be comprised of high index materials, such as Si, SiN, or SiON. The cladding regions 132, 136 can be comprised of $SiO_2$ or the like. Afterwards, a deep etch process is used to etch a certain section of the waveguide structure 132 to form an air hole 142, as shown in FIG. 5B. Note that the formation of the air hole 142 has created two distinct waveguide portions 144, 146. These portions 144, 146 can be used to form an input and output waveguide to be coupled with a PBG structure. Standard techniques for deep etching can be used to form the air hole 142.

Figure 5C:
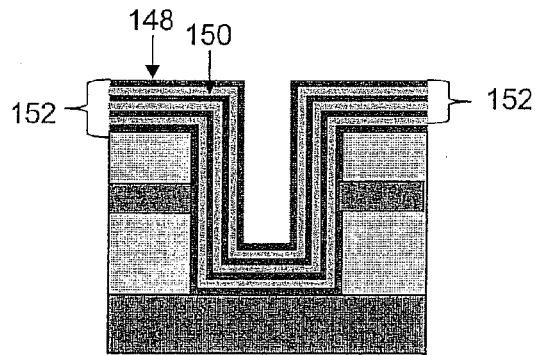
Figure 5D:
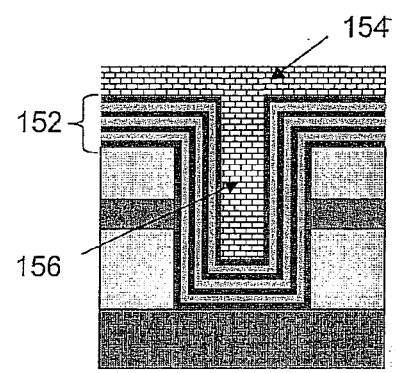
Figure 5E:
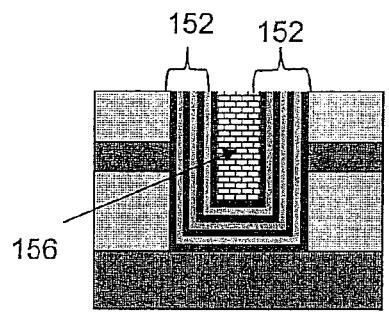
Figure 5F:
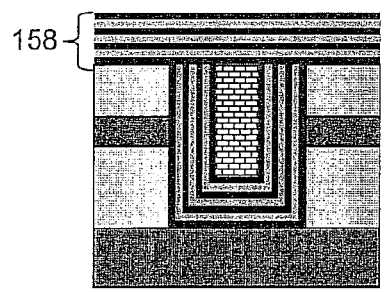

FIG. 5C shows the deposition of a high index 148 and low index 150 layers to form a PBG stack 152. The high 148 and low index 150 layers are deposited using chemical vapor deposition (CVD) to stack the high 148 and low index 150 layers where low pressure chemical deposition (LPCVD) is preferred since LPCVD usually has better step coverage. After making the PBG stack 152, a defect layer 154 is formed by depositing in the cavity region 156 of the PBG stack 152 the necessary materials using a CVD technique, such as LPCVD or the like, as shown in FIG. 5D. If necessary, planarization can be used to remove the excess layers of the PBG stack 152 and defect layer 156, as shown in FIG. 5E. If necessary, it is possible to add a top PBG layer 158 after planarizing the surface to achieve better light confinement, as shown in FIG. 5F. By employing this fabrication steps, we don't have to use fine lithography system which is usually quite expensive and leads to high production cost. Only the air hole is required to realize these PBG devices.

Figure 6:
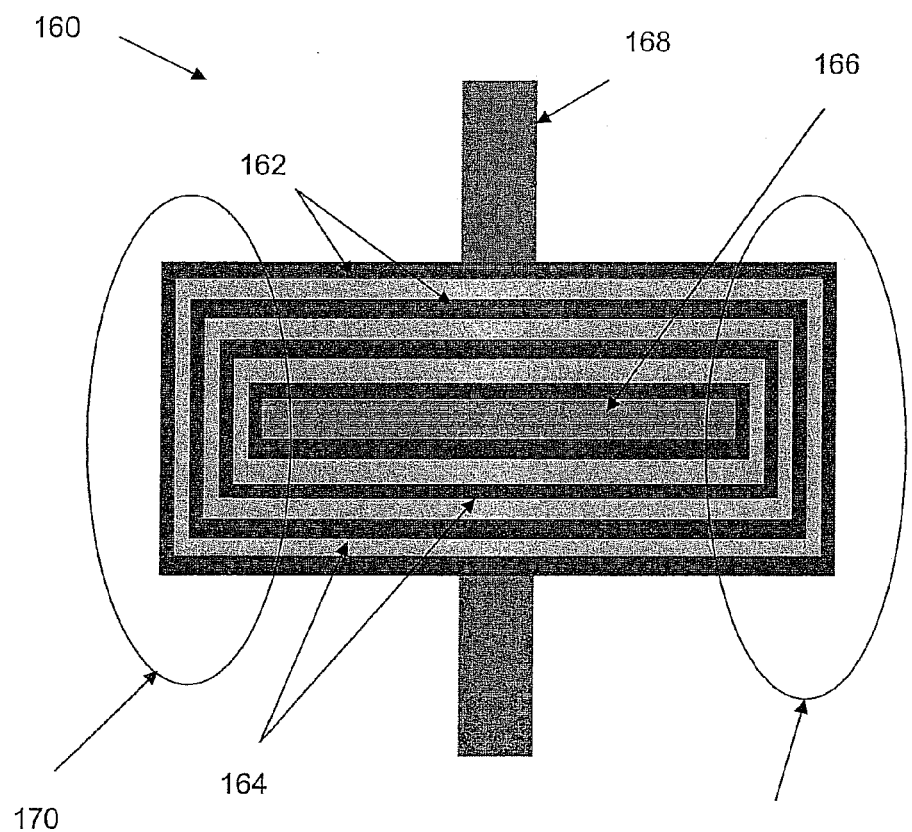
FIG. 6 is a schematic diagram demonstrating the top view of a PBG device.

FIG. 6 shows the top view of the inventive PBG device 160. The PBG device 160 includes high index layers 162, low index layers 164, and a defect layer 166. Moreover, the PBG device 160 is coupled to a waveguide 168. The sidewalls 170, 172 of the PBG device 160 are also fabricated with the PBG layers 162, 164. In this arrangement, light is confined laterally.

The present invention makes it possible to obtain compact and simple devices based on the same simple structure. These devices can be integrated with an optical waveguide using CMOS compatible processes. The ease of using the invention to make PBG structures without significant cost provides a clear advantage over other prior art techniques.

Although the present invention has been shown and described with respect to several preferred embodiments thereof, various changes, omissions and additions to the form and detail thereof, may be made therein, without departing from the spirit and scope of the invention.

What is claimed is:

1. An optical device comprising:
   at least two photonic bandgap crystal (PBG) stacks that are each comprised of alternating layers of high and low refractive index materials; and
   a defect region comprising doped Er formed in a cavity region between said at least two photonic bandgap crystal stacks so as to provide the properties needed to reflect light received by said optical device by applying a bias to said defect region to shift a defect mode by changing the refractive index of said defect region;
   wherein said defect region comprises a thickness of $\lambda/2n$, where n is the refractive index of said defect region and $\lambda$ is the wavelength of a signal entering said optical device having a Q of at least 1,000.

2. The optical device of claim 1, wherein said optical device is a modulator.

3. The optical device of claim 2, wherein said at least two PBG stacks each comprise three sets of said alternating layers of high and low refractive index materials.

4. The optical device of claim 1, wherein said high and low index layers comprise a thickness of $\lambda/4n_1$, wherein $\lambda$ is the wavelength of a signal entering said optical device and $n_1$ is the optical refractive index of said layers.

5. The optical device of claim 1, wherein said optical device is an optical amplifier.

6. The optical device of claim 5, wherein said defect region comprises Erbium.

7. The optical device of claim 1, wherein said high refractive index materials comprise Si, SiN, or SiON.

8. The optical device of claim 1, wherein said low refractive index materials comprise $SiO_2$.

9. A method of forming an optical device comprising:
   forming at least two photonic bandgap crystal (PBG) stacks that are each comprised of alternating layers of high and low refractive index materials; and
   forming a defect region comprising doped Er in a cavity region between said at least two photonic bandgap crystal stacks so as to provide the properties needed to reflect light received by said optical device by applying a bias to said defect region to shift a defect mode by changing the refractive index of said defect region wherein said defect region comprises a thickness of $\lambda/2n$, where n is the refractive index of said defect region and $\lambda$ is the wavelength of a signal entering said optical device having a Q of at least 1,000.

10. The method of claim 9, wherein said optical device is a modulator.

11. The method of claim 10, wherein said at least two PBG stacks each comprise three sets of said alternating layers of high and low refractive index materials.

12. The method of claim 9, wherein said high and low index layers comprise a thickness of $\lambda/4n_1$, wherein $\lambda$ is the wavelength of a signal entering said optical device and $n_1$ is the optical refractive index of said layers.

13. The method of claim 9, wherein said optical device is an optical amplifier.

14. The method of claim 13, wherein said defect region comprises Erbium.

15. The method of claim 9, wherein said high refractive index materials comprise Si, SiN, or SiON.

16. The method of claim 9, wherein said low refractive index materials comprise $SiO_2$.

* * * * *